United States Patent [19]

Lang

[11] Patent Number: 4,471,613

[45] Date of Patent: Sep. 18, 1984

[54] MOTOR WITH ECCENTRICALLY SHIFTABLE BUOYANT ROTOR MEMBER

[76] Inventor: Franz Lang, Kenzinger Str. 36, D-7833 Endingen am Kaiserstuhl, Fed. Rep. of Germany

[21] Appl. No.: 452,023

[22] Filed: Dec. 21, 1982

[30] Foreign Application Priority Data

Dec. 24, 1981 [DE] Fed. Rep. of Germany ....... 3151258

[51] Int. Cl.³ ............................................... F03B 9/00
[52] U.S. Cl. .......................................... 60/496; 415/7
[58] Field of Search ................. 60/495, 496, 650, 682; 415/7; 417/337

[56] References Cited

U.S. PATENT DOCUMENTS 3,360,926 1/1968 Parr ........................................ 60/496
3,860,355 1/1975 Dell .......................................... 415/7
4,196,590 4/1980 Fries ....................................... 60/496

*Primary Examiner*—Stephen F. Husar
*Attorney, Agent, or Firm*—Peter K. Kontler

[57] ABSTRACT

A motor wherein a stationary carrier supports one or more rotors each having a hollow cylindrical or endless belt-like buoyant member confining an annulus of separate inflatable and deflatable compartments for alternative admission of heated gaseous fluid and evacuation of spent fluid while the buoyant member is at least partially immersed in a supply of liquid. The inflated compartments push the buoyant member sideways and thus hold the buoyant member in a position of eccentricity with reference to the carrier and/or with reference to a hub, which is mounted on the carrier and receives torque from the buoyant member, so that the latter rotates due to its eccentric positioning and under the action of the lifting force.

43 Claims, 9 Drawing Figures

MOTOR WITH ECCENTRICALLY SHIFTABLE BUOYANT ROTOR MEMBER

BACKGROUND OF THE INVENTION

The present invention relates to improvements in motors in general, and more particularly to improvements in motors with eccentrically shiftable buoyant rotor members.

Motors of the type to which the present invention pertains are disclosed in British Pat. No. 305,876. A drawback of the patented motors is that they can be operated only by resort to a flowing liquid medium. Such conventional motors cannot be driven by utilizing heat, e.g., the heat which can be recovered from combustion products.

OBJECTS AND SUMMARY OF THE INVENTION

An object of the invention is to provide a motor wherein a radially movable buoyant rotor member can be set in motion by a gaseous fluid in combination with a stagnant body of liquid, and which is constructed and assembled in such a way that it can utilize heat energy to set in rotary motion one or more rotor members so that such member or members rotate at a desired speed.

Another object of the invention is to provide a motor which can utilize heat recovered from combustion products and which can rotate one or more rotor members in response to establishment of temperature differences between several fluid bodies, such as a body of gas and a body of liquid, two bodies of sea water or the like.

A further object of the invention is to provide the motor with novel and improved means for rotating one or more buoyant rotary members at a desired speed.

An additional object of the invention is to provide a novel and improved rotor for use in a motor of the above outlined character.

Another object of the invention is to provide the motor with novel and improved means for recovering heat energy from one or more bodies of gaseous or hydraulic fluid.

An additional object of the invention is to provide a motor which is constructed and assembled in such a way that it can efficiently recover heat energy from gaseous combustion products in a small area and by resort to a relatively small number of simple parts.

Another object of the invention is to provide the motor with novel and improved means for utilizing the buoyancy of a rotor component to drive the latter at a desired speed.

A further object of the invention is to provide a novel and improved method of driving the rotor of a motor by resort to heat energy which is recovered from combustion products or the like.

The invention is embodied in a motor which comprises a supply of liquid, a rotor including a hollow buoyant member which is at least partially immersed in the supply of liquid so that it tends to rise, a carrier which rotatably and radially movably mounts the buoyant member, a succession of expansible and contractible (variable-volume) compartments on (e.g., in the interior of) the buoyant member, and means for admitting into successive compartments a gaseous fluid so as to move the buoyant member to a position of eccentricity with reference to the carrier and at least in part transversely of the direction of the force tending to lift the buoyant member in the supply of liquid whereby the buoyant member is caused to rotate with reference to the carrier. For example, the mounting of the compartments on the buoyant member can be such that the latter is shifted horizontally, i.e., at right angles to the direction of action of lifting force upon the buoyant member. The lifting force then automatically rotates the buoyant member with reference to the carrier as long as the member is held out of that position which it would assume if all of the compartments were under identical pressure, namely, out of that position in which the fact that the member is immersed in the supply of liquid would merely cause the member to rise but not to rotate relative to the carrier. The carrier may be a stationary part whose axis is laterally offset with reference to the axis of the buoyant member when the latter is held in the aforementioned position of eccentricity due to admission of pressurized fluid into some of the compartments. The remaining compartments are then preferably free to discharge spent gaseous fluid so that their volume decreases below the volume of those compartments which receive gaseous fluid from the admitting means.

The fluid admitting means can comprise a source of hot gaseous fluid and means for supplying hot gaseous fluid from such source to successive compartments on the buoyant member. The gaseous fluid may but need not be air; for example, the gaseous fluid may constitute products of combustion which are intercepted and guided along a closed or open path a portion of which is adjacent to the endless path of movement of compartments with the buoyant member.

The motor can further comprise suitable means for regulating the admission of gaseous fluid into and the evacuation of gaseous fluid from the compartments in response to rotation of the buoyant member. Such regulating means may include a portion of the carrier and a hub which is rotatably mounted on the carrier and receives torque from the buoyant member. For example, the peripheral surface of an elongated horizontal shaft-like carrier can be provided with two discrete chambers the first of which receives hot gaseous fluid from the aforementioned source and the second of which can return spent (cooled) gaseous fluid from the compartments to the source where the fluid can be reheated prior to renewed admission into the first chamber. The hub has at least one aperture for each of the compartments, and such apertures pass along the first chamber, thereupon along the second chamber, again along the first chamber, and so forth to alternately admit hot gaseous fluid into the respective compartments and to permit spent gaseous fluid to flow from the respective compartments into the second chamber. Alternatively, the regulating means can comprise a stationary valve plate which can be mounted on the carrier adjacent to one axial end of the buoyant member, and the latter is provided with apertures which alternately connect the respective compartments with first and second chambers (e.g., grooves machined into the valve plate) whereby the first chamber admits heated gaseous fluid into and the second chamber receives cooled gaseous fluid from the neighboring compartments. Such compartments can be provided in the interior of the buoyant member and the latter then comprises an end wall (e.g., a collar or a cover) which is formed with at least one aperture or port for each of the compartments.

If the rotor comprises a hub which is rotatable on or otherwise with reference to the carrier about a fixed axis, the buoyant member can include or constitute a tube which spacedly surrounds the hub so that it is movable radially of the fixed axis. The compartments can be disposed between the hub and the tube and each thereof can be connected to or can form part of the hub and/or buoyant member.

The means for heating the gaseous fluid in the aforementioned source (such source can constitute a heating chamber) may include a heat exchanger, e.g., a heat exchanger which receives hot products of combustion from a furnace or an engine and which can include a jacket surrounding a portion of or the entire heating chamber as well as a pipe or an analogous tubular portion which discharges cooled combustion products to the atmosphere or elsewhere and can extend through a suitable vessel which confines the supply of liquid so that the combustion products heat the gaseous fluid in the heating chamber as well as the supply of liquid in the vessel.

The carrier may be mounted in one sidewall of the aforementioned vessel and an end portion thereof can be formed with a socket for reception of a shaft which is driven by the rotor (either directly by the buoyant member or by the hub which, in turn, receives torque from the buoyant member) and extends through another sidewall of the vessel to transmit torque to one or more driven units. Alternatively, the carrier may constitute an elongated shaft or a similar component having a first end portion mounted in the one sidewall and a second end portion mounted in a bearing sleeve which is installed in the other sidewall of the vessel. The carrier can rotatably mount a sleeve-like or otherwise configurated driving element which receives torque from the rotor. In such a motor, the means for transmitting torque to one or more driven units can further comprise a shaft which is rotatably journalled in the other sidewall of the vessel and a transmission which transmits a torque from the driving element to the shaft. The transmission can include a first gear driven by the driving element and a second gear which drives the shaft and receives torque from the first gear (either directly or through the medium of one or more additional gears). The ratio of the transmission can be one-to-one; however, it is equally within the purview of the invention to employ a step-up to step-down transmission. The housing of the transmission (e.g., a case for the aforementioned gears) can be installed in the interior of the vessel.

If the buoyant member is a tube, it is preferably provided with inwardly extending annular end walls which flank the axial ends of the aforementioned hub. The rotor then further comprises sealing means (e.g., rings) interposed between the inner side of each end wall and the respective axial end of the hub. Such seals prevent the flow of liquid from the interior of the vessel into the interior of the buoyant member, i.e., into the space which preferably accommodates the aforediscussed compartments.

The motor can further comprise a conduit which returns spend gaseous fluid from the second chamber to the heating chamber and can form one or more coils which are immersed in the supply of liquid in the vessel so that the gaseous fluid flowing from the second chamber to the heating chamber can exchange heat with the supply of liquid. Another conduit can be provided to convey heated fluid from the heating chamber to the first chamber. The means for causing the fluid to flow along the path which is defined by the two conduits, the first and second chambers and the heating chamber can include a pump which is preferably installed in the return conduit upstream of the heating chamber. It is also possible and often advisable to install in the return conduit check valve means downstream of the pump means so as to prevent the flow of fluid from the heating chamber toward the pump means. Such check valve means is desirable when the number of compartments which communicate with the first chamber equals or closely approximates the number of compartments which communicate with the second chamber. If the number of compartments which communicate with the first chamber appreciably exceeds the number of compartments which communicate with the second chamber, the check valve means can be dispensed with.

The compartments can form a complete annulus and can include preferably deformable partitions separating the neighboring compartment of such annulus from one another. Each compartment can further comprise an outer wall secured to the buoyant member and an inner wall secured to the hub. The volumes of all of the compartments may be identical when the buoyant member is coaxial with the hub, i.e., when the eccentricity of the buoyant member is zero. Alternatively, the compartments can be separated from one another by walls in the form of laminae extending substantially radially of the buoyant member and having radially innermost portions reciprocable in recesses or sockets provided therefor in the peripheral surface of the hub. The laminae can be provided with followers which are coupled to the buoyant member so that the laminae can share the radial movements of the buoyant member with reference to the hub. To this end, such followers can extend into a track which is machined into the internal surface of an end wall of the buoyant member. If the latter has two end walls, each such end wall can be provided with an internal track, and each lamina then carries two followers each extending into a different track.

The compartments can constitute radially extending cylindrical bores machined into the peripheral surface of the hub. The rotor then further comprises pistons which are reciprocable in the cylindrical bores and have portions coupled to the buoyant member so that the latter is maintained in a position of eccentricity with reference to the hub in response to admission of pressurized gaseous fluid into successive bores of the hub as the latter rotates with the buoyant member.

The motor of the present invention can comprise two or more rotors whose hubs are rotatably mounted on a common carrier and are coaxial with one another. Such motor then further comprise means for (preferably separably) coupling the neighboring hubs to one another. Each of the hubs is surrounded by a discrete buoyant member and all of the buoyant members can be immersed in a single supply of liquid. The compartments on the plural buoyant members of such a composite motor are preferably angularly offset with reference to one another to enhance the smoothness of operation of the rotors, i.e., to ensure that the RPM of the hubs fluctuates very little or not at all.

The means for transmitting torque from the buoyant member to the respective hub or driving element can comprise one or more deformable membranes each having a first portion connected with the buoyant member and a second portion connected to the hub and/or to the driving element.

The buoyant member can constitute or comprise an endless flexible element in the form of a belt or band having inner and outer flexible walls and an annulus of compartments between such walls. As the flexible element moves relative to the carrier, the compartments move along an endless path. The first and second chambers are then adjacent to first and second portions of such endless path, and the flexible element has apertures which connect the compartments with the first chamber during movement along the first portion and with the second chamber during movement along the second portion of the path. The compartments expand during travel along the first portion of the path because they receive pressurized gaseous fluid, and the compartments contract during movement along the second portion of the path because they are allowed to admit spent (cooled) gaseous fluid into the second chamber. Such a motor can further comprise a pair of wheels over which the flexible element is trained. The flexible element is arranged to drive at least one of the wheels, i.e., such one wheel can replace the aforementioned hub which latter is desirable and advantageous when the buoyant member is a tubular body such as a hollow cylinder.

As mentioned above, the length of the first chamber, as considered in the direction of travel of compartments along their endless path, can exceed the length of the second chamber so that the number of compartments which receive, at any time, a gaseous fluid at relatively high pressure exceeds the number of compartments which are in the process of discharging spent gaseous fluid into the second chamber.

Each compartment may comprise or may be defined by a discrete bellows or an analogous deformable body which moves along an endless path in response to rotation of the buoyant member (the movement of the aforementioned endless flexible element around a plurality of pulleys, wheels or like components is also considered a rotary movement).

The path along which the gaseous fluid is circulated can be an endless path, i.e., the aforementioned return conduit can deliver spent fluid into the heating chamber where the fluid is reheated prior to admission into the first chamber and into those compartments which happen to communicate with the first chamber. The means for causing the fluid to circulate along such endless path can comprise the aforementioned pump means. Alternatively, the means for circulating the fluid along the endless path can include the first and second chambers, i.e., the fluid will readily circulate along such path if the length of the first chamber appreciably exceeds the length of the second chamber, namely, if the number of compartments which receive gaseous fluid at an elevated pressure exceeds the number of compartments which discharge spent (lower-pressure) fluid into the second chamber.

Alternatively, the fluid conveying means can define an open path having an inlet for reception of gaseous fluid upstream of the first chamber and an outlet for spent gaseous fluid downstream of the second chamber. The compartments are arranged to travel along an endless path in such direction that each thereof first receive heated fluid from the first chamber and thereupon discharges spent fluid into the second chamber. The means for causing the fluid to flow along an open path can include one or more pumps. The open path can be defined in part by the aforementioned heating chamber which is disposed upstream of the first chamber and can receive hot gaseous fluid (e.g., from a source of combustion products) or wherein the heating fluid (e.g., air) can be heated by a burner, by one or more heat exchangers or in another suitable way.

The novel features which are considered as characteristic of the invention are set forth in particular in the appended claims. The improved motor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
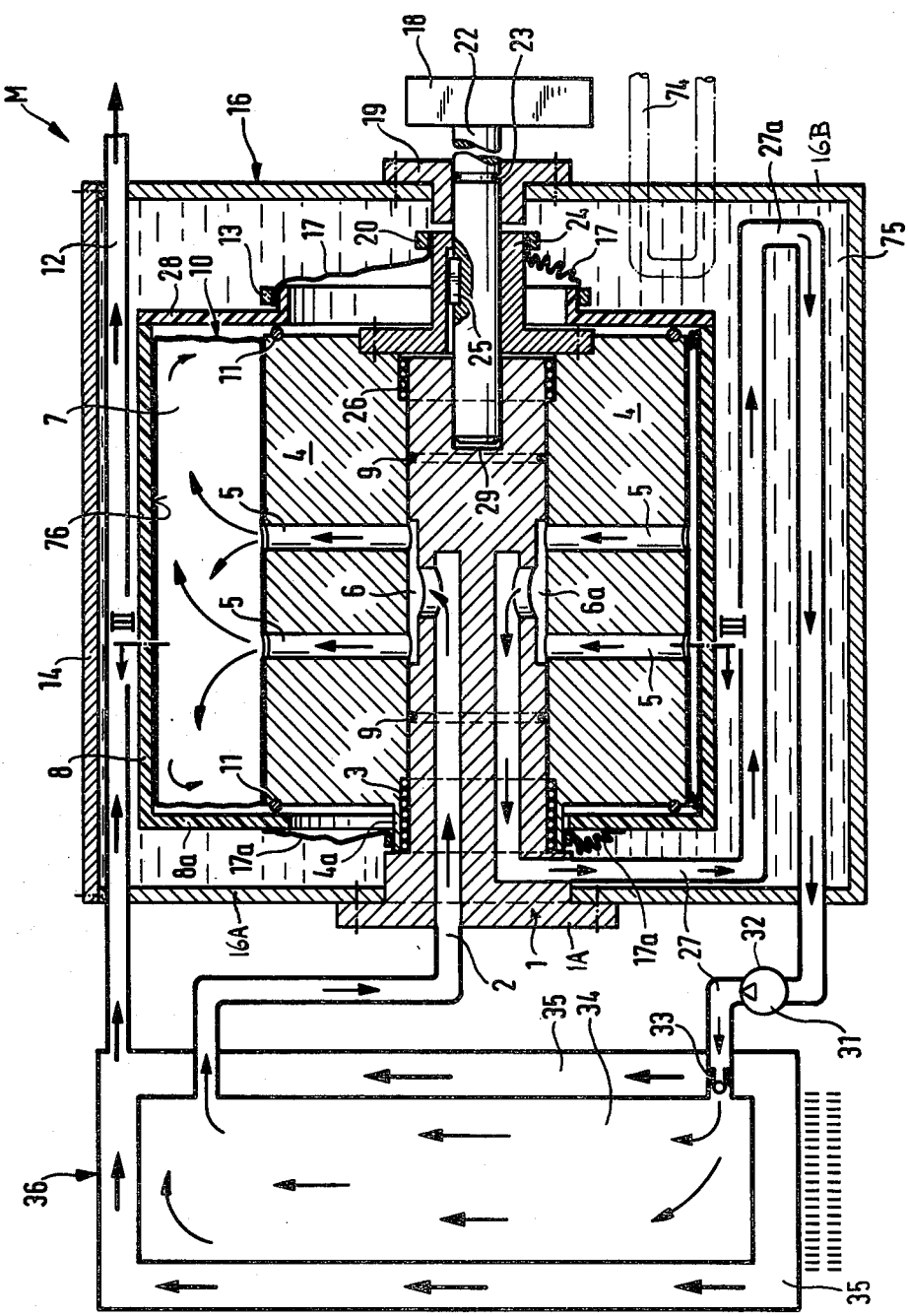
FIG. 1 is a somewhat schematic partly elevational and partly central vertical sectional view of a motor which embodies one form of the invention and comprises a single rotor including a hollow cylindrical buoyant rotor member.
Figure 3:
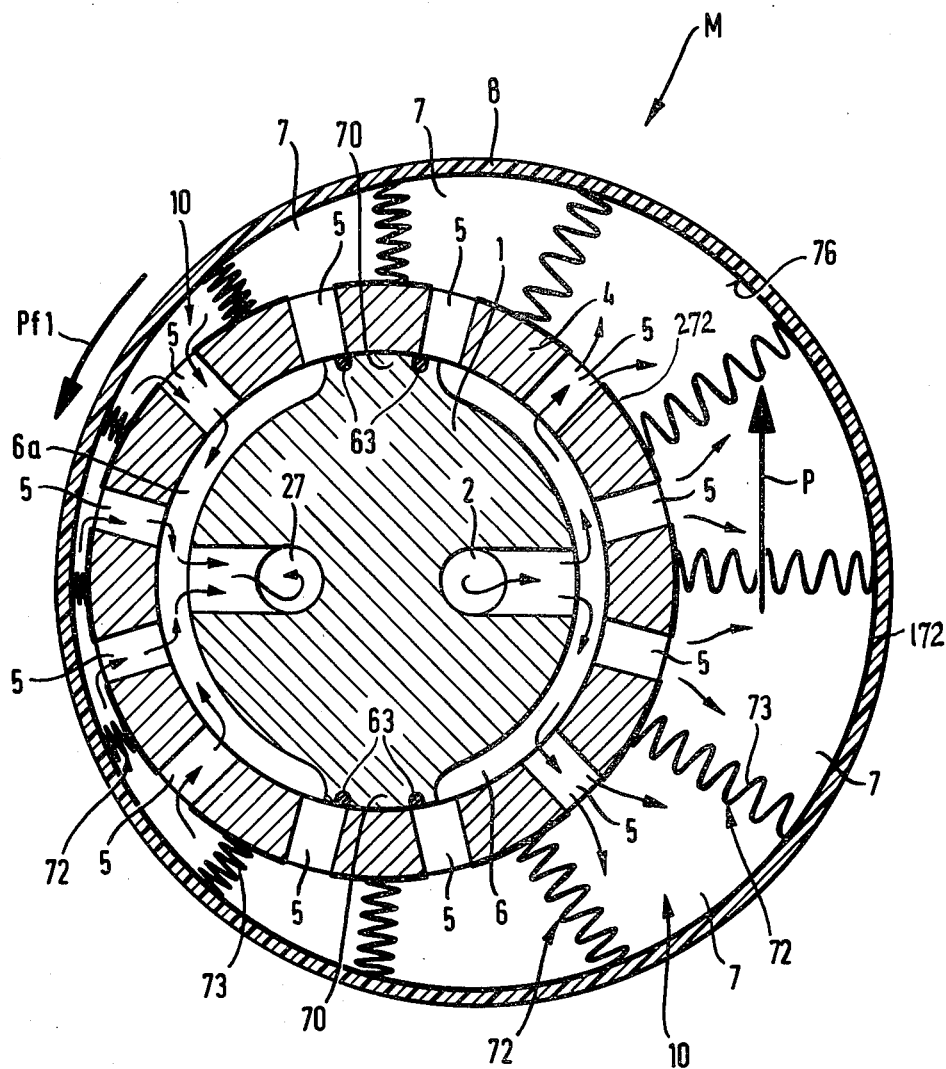
FIG. 3 is an enlarged fragmentary transverse vertical sectional view as seen in the direction of arrows from the line III—III of FIG. 1.

Referring first to FIGS. 1 and 3, there is shown a motor which embodies one form of the present invention and includes a rotor M installed in the interior of a stationary vessel 16 containing a stagnant supply 75 of liquid, e.g., water. The left-hand sidewall 16A of the vessel 1, as viewed in FIG. 1, is connected with and supports a horizontal shaft-like carrier 1 having a flange 1A secured to the sidewall 16A by bolts, rivets or other suitable fasteners, not specifically shown. The upper or top wall 14 of the vessel 16 preferably constitutes a removable cover which affords access to the interior of the vessel. The peripheral surface of the carrier 1 is formed with two circumferentially extending grooves 6 and 6a the first of which constitutes a fluid admitting chamber and the second of which constitutes a fluid discharging chamber. A first conduit 2 (a portion of which can constitute a channel or bore machined into the carrier 1) connects the fluid supplying chamber 6 with a fluid heating chamber 34 which is further connected with the discharge end of a fluid returning or evacuating conduit 27 connected to the fluid discharging chamber 6a of the carrier 1. A portion of the conduit 27 can constitute a coil (shown at 27a). The fluid in the coil 27a is cooled by exchanging heat with the supply 75 of stagnant liquid in the vessel 16. As can be seen in FIG. 1, the conduit 2 extends from the flange 1A of the carrier 1 whereas the conduit 27 extends through the sidewall 16A of the vessel 16. The direction in which the fluid circulates along the endless path defined in part by the chamber 34, conduits 2, 27 and chambers 6, 6a is indicated by arrows.

The end portions of the carrier 1 are surrounded by bearings 3 and 26 for a hub 4 which is rotatable on the carrier with a minimum of friction. Ring-shaped radial seals 9 are disposed around the periphery of the carrier 1 and within the confines of the hub 4 so as to prevent the flow of liquid from the interior of the vessel 16 into the chambers 6, 6a and/or to prevent the flow of gaseous fluid from the chambers 6, 6a, along the periphery of the carrier 1, and into the supply 75 of liquid in the vessel. The left-hand end portion of the hub 4 has a smaller-diameter tubular extension 4a which surrounds the bearing 3 and abuts against an external shoulder of the carrier 1 so that the hub 4 is held against excessive axial movements in a direction to the left, as viewed in FIG. 1. Moreover, the external surface of the extension 4a limits the extent of radial movement of a tubular buoyant member 8 which spacedly surrounds and rotates with the hub 4 relative to the carrier 1 and vessel 16. The tubular member 8 is at least partially immersed into the supply 75 of liquid in the vessel 16.

The aforementioned rotor M can be said to constitute a composite body which includes the hub 4 (the latter is rotatable on but cannot move radially of the carrier 1) and the tubular member 8 which is movable radially of but rotates with the hub 4. The inner diameter of the tubular member 8 greatly (or at least appreciably) exceeds the outer diameter of the hub 4. When the motor of FIGS. 1 and 3 is in operation, the axis of the tubular member 8 is at least substantially parallel to but is spaced apart laterally from the common axis of the carrier 1 and hub 4. This can be seen in FIG. 3 wherein the axis of rotation of the tubular member 8 is located well to the right of the axis of the hub 4.

The tubular member 8 comprises a hollow cylindrical shell having an inwardly extending annular end wall or collar 8a at one of its axial ends (this collar surrounds the aforementioned axial extension 4a of the hub 4) and an annular end wall cover 28 at the other axial end. The collar 8a overlies and is slightly spaced apart from the left-hand end face and the cover 28 overlies and is slightly spaced apart from the right-hand end face of the hub 4, as viewed in FIG. 1. Suitable sealing rings 11 are inserted between the end faces of the hub 4 and the respective end walls 8a, 28 of the tubular member 8 so as to prevent penetration of liquid from the interior of the vessel 16 into the annulus 10 of discrete compartments 7 between the external surface of the hub and the internal surface 76 of the tubular member 8. The sealing rings 11 are designed to prevent the flow of liquid between the interior of the vessel 16 and the interior of the tubular member 8 but permit the latter to move radially of the hub 4. It is presently preferred to cast, pour, machine, blow, extrude or otherwise form the tubular member 8 of a lightweight synthetic plastic material in order to enhance the buoyancy of such tubular member in the supply 75 of liquid which at least partially fills the vessel 16. In order to reduce the ability of the supply 75 of liquid to offer a pronounced resistance to rotation and/or other movements of the tubular member 8 relative to the vessel 16, the external surface of the cylindrical shell of the tubular member 8 is preferably polished or otherwise smoothened to thereby enhance the efficiency of the motor.

The aforediscussed annulus 10 of compartments 7 which surround the external surface of the hub 4 within the confines of the tubular member 8 is designed in such a way that each of the compartments 7 is sealed from the supply 75 of liquid in the vessel 16 but is free to communicate with one of the chambers 6, 6a at a time. As can be readily seen in FIG. 3, the neighboring compartments 7 of the annulus 10 are separated from each other by substantially radially extending deformable partitions 72 which are provided with pleats or corrugations 73 or are otherwise designed to allow for pronounced radial movements of the tubular member 8 with reference to the hub 4. FIG. 3 shows that the annulus 10 is composed of twelve compartments 7; however, such number can be increased or reduced without departing from the spirit of the invention. The illustrated partitions 72 can be made of rubber or another suitable elastomeric material and are bonded, mechanically clamped or otherwise secured to the internal surface 76 of the tubular member 8 as well as to the external surface of the hub 4. The corrugations or pleats 73 not only allow for the required lengthening or shortening of the respective partitions 72 (as considered in the radial direction of the hub 4) but they also ensure that the partitions 72 offer minimal resistance to radial movements of the tubular member 8 with reference to the hub 4. As mentioned above, each of the compartments 7 communicates with the chamber 6 or 6a, depending on its momentary angular position with reference to the non-rotatable carrier 1. The hub 4 is formed with radially extending apertures 5 in the form of ports which are designed to establish communication between the compartments 7 and the chamber 6 or 6a of the carrier 1. The number of ports 5 may equal or exceed the number of compartments 7; for example, each of the compartments 7 can communicate with an entire row of ports 5 extending in the axial direction of the hub 4.

The right-hand end portion of the hub 4, as viewed in FIG. 1, is connected with a coaxial sleeve-like driving element 24 which is non-rotatably connected to a driver shaft 22 by one or more keys 25 or in another suitable way. For example, the external surface of the shaft 22 can be splined to fit into the internally splined driving element. The shaft 22 extends outwardly through the right-hand sidewall 16B of the vessel 16 and is surrounded by a bearing sleeve 19 attached to the external surface of the sidewall 16B. The bearing sleeve 19 can form part of a stuffing box through which the shaft 22 extends. A ring-shaped shaft seal 23 is interposed between the peripheral surface of the shaft 22 and the internal surface of the bearing sleeve 19. The purpose of the shaft 22 is to transmit torque from the rotor M to a driven unit 18, e.g., to a machine whose input element must be set in rotary motion. The exact nature of the driven unit 18 forms no part of the invention; for example, this unit can constitute, form part of or include a generator. The inner end portion of the shaft 22 is rotatably journalled in an axial blind bore or socket 29 machined into the right-hand end face of the carrier 1, as viewed in FIG. 1. In this manner, the entire carrier 1 is held against stray movements (e.g., wobbling) with reference to the vessel 16.

Each of the compartments 7 can be said to constitute a bellows which is completely sealed save for the provision of one or more passages for the flow of gaseous fluid between its interior and the chamber 6 or 6a (via one or more apertures or ports 5 of the hub 4).

The sealing rings 11 can be replaced by or utilized jointly with torque-transmitting deformable annular membranes 17 and 17a. The outer marginal portion of the right-hand membrane 17 (as viewed in FIG. 1) is sealingly secured to an axially extending innermost portion of the end wall or cover 28 by a clamping ring 13, and the inner marginal portion of this membrane is sealingly secured to the driving element 24 by a clamping ring 20. The other membrane 17a is respectively secured to the end wall or collar 8a of the tubular member 8 and to the extension 4a of the hub 4. Each of these membranes is capable of preventing the flow of liquid from the supply 75 into the interior of the tubular member 8 and/or the flow of gaseous fluid from the interior of the tubular member into the interior of the vessel 16. The arrangement is such that the membranes 17 and 17a are non-rotatably secured to the respective parts 24, 28 and 4a, 8a so that they can transmit torque from the tubular member 8 to the hub 4 and driving element 24 when the member 8 is rotated in the interior of the vessel 16. The deformability of each of these membranes suffices to enable the tubular member 8 to perform the aforediscussed radial movements with reference to the hub 4, carrier 1 and driving element 24. The torque-transmitting feature does not entail a pronounced stressing of the deformable membranes 17, 17a because the transmission of torque from the tubular member 8 to the driving element 24 takes place primarily (or at least to a considerable extent) via those partitions 72 which happen to undergo pronounced deformation as a result of a reduction of the volume of the neighboring compartments 7 (note the left-hand portion of FIG. 3 where three partitions 72 are shown in a highly deformed condition as a result of highly pronounced reduction of the volume of the respective compartments 7 owing to the eccentricity of the tubular member 8 with reference to the hub 4).

Each of the compartments 7 can be constituted or defined by a bellows having two radially extending walls or partitions (such as the partitions 72 shown in FIG. 3) a radially outermost wall (shown in FIG. 3 at 172) which is bonded to the internal surface 76 of the tubular member 8 and can come into actual contact with the periphery of the hub 4 when the volume of the respective compartment 7 is reduced to a minimal value, and a radially innermost wall 272 secured to the hub 4. This brings the wall 172 into frictional engagement with the hub 4 or the wall 272 so that the tubular member 8 can transmit pronounced torque to the driving element 24 which rotates with the hub 4.

The embodiment of FIGS. 1 and 3 further employs means for promoting the circulation of gaseous fluid along the endless path which is defined by the chambers 6, 6a, 34 and conduits 2, 27. Such promoting means comprises a pump 31 which is installed in the conduit 27 downstream of the coil 27a and is equipped with an equalizing valve 32. This pump is mounted upstream of a check valve 33 which is installed at the junction of the conduit 27 with the chamber 34. The parts 31 and 33 are desirable in the embodiment of FIGS. 1 and 3 because the number of compartments 7 which communicate with the chamber 6 equals the number of compartments 7 communicating with the chamber 6a. This is due to the fact that each of the chambers 6, 6a extends along an arc of nearly 180 degrees, as considered in the circumferential direction of the carrier 1.

FIG. 1 further shows a heat exchanger 36 which is installed externally of the vessel 16 and surrounds the chamber 34. The lower portion of the chamber 34 receives a stream of air or another gaseous fluid via conduit 27, and its upper portion discharges a stream of fluid into the conduit 2 so that the fluid flows into the chamber 6, thence into a first group of compartments 7, from such group of compartments into the chamber 6a, and from the chamber 6a into the lower portion of the chamber 34 via conduit 27 and its coil 27a. The jacket 35 of the heat exchanger 36 surrounds the chamber 34 and communicates with a pipe 12 for evacuation of heating medium, e.g., hot combustion products. It is clear that the jacket 35 need not surround the entire heating chamber 34; all that counts is to ensure that the stream of gaseous fluid which is supplied by the conduit 27 is heated up before it flows into the conduit 2 and thence into the chamber 6 and into those compartments 7 which happen to communicate with the chamber 6. The volume of the gaseous fluid increases in response to heating in the chamber 34. Such increase in the volume of gas entails an increase in the capacity (inflation or expansion) of the compartments 7 which communicate with the chamber 6 and the resulting lateral radial shifting of the tubular member 8 relative to the hub 4, carrier 1 and driving element 24. The hot combustion products are assumed to enter the jacket 35 at a level below the chamber 34, and such combustion products flow upwardly toward and into the pipe 12 while exchanging heat with the gaseous fluid in the chamber 34. As shown, the pipe 12 can extend through the vessel 16 to exchange heat with the supply 75 of liquid therein. Thus, such supply of liquid can be heated by the coil 27a as well as by the pipe 12.

If desired, the motor of the present invention can comprise at least one additional or auxiliary heat exchanger 74 (indicated in FIG. 1 by phantom lines) which can be used to convey heat energy to a consumer, e.g., to a supply of gaseous fluid in a second heating chamber corresponding to the heating chamber 34 of FIG. 1. Thus, the structure which is shown in FIGS. 1 and 3 can form part of a multi-stage system each stage of which comprises a discrete rotor M and one of which transmits heat to the other stage or stages. Alternatively, the heat exchanger 74 can be used to convey energy for the purpose of heating one or more rooms or for other purposes.

As shown in FIG. 3, the chambers 6 and 6a of the carrier 1 are separated from one another by a pair of sealing portions or lands 70 which are disposed diametrically opposite each other because the length of the chamber 6 (as measured in the circumferential direction of the carrier 1) matches the length of the chamber 6a. The lands 70 are surrounded by cord-like pressure-resistant sealing elements 63 which engage the internal surface of the hub 4 to prevent the gaseous fluid from leaking between the chambers 6 and 6a. As mentioned above, the hub 4 can rotate on the bearings 3 and 26 which surround the carrier 1. The dimensions of all compartments 7 (when the axis of the tubular member 8 coincides with that of the hub 4) may but need not be the same. These compartments enable the tubular member 8 to move radially of the hub 4 to the extent which is determined by the collar 8a and extension 4a because the partitions 72 are readily deformable and do not appreciably oppose the movements of the tubular member to different positions of eccentricity with reference to the hub. The pressure of gaseous fluid which enters certain compartments 7 via conduit 2 and chamber 6 causes such compartments to expand so that the tubular member 8 is shifted radially of the hub 4 and to the right, as viewed in FIG. 3. The buoyancy of the tubular member 8 urges the latter upwardly (note the force denoted by the arrow P in FIG. 3) whereby the tubular member 8 turns in the direction of arrow Pf1 and rotates the input element of the driven unit 18 via hub 4, driving element 24, key 25 and shaft 22. The lever arm which causes the tubular member 8 to rotate increases with increasing eccentricity of the tubular member with reference to the carrier 1. As the tubular member 8 rotates, the ports 5 which communicate with the expanded or inflated compartments 7 travel over the upper land 70 at the apex of the carrier 1 (as viewed in FIG. 3) and cause the compartments 7 to admit gas into the chamber 6a for return flow into the heating chamber 34. At the same time, successive compartments 7 in the lower part of FIG. 3 move past the lower land 70 of the carrier 1 and begin to communicate with the chamber 6 so that such compartments expand and the axis of the rotating tubular member 8 continues to remain to the right of the common axis of the hub 4 and carrier 1. The just described mode of operation continues as long as the chamber 34 heats the gaseous fluid, which is admitted to its lower portion via conduit 27, and admits the heated fluid into the conduit 2 for entry into the chamber 6 and into those compartments 7 whose ports 5 happen to communicate with the chamber 6. The extent to which the axis of the tubular member 8 is shifted with reference to the hub 4 depends on a number of parameters, primarily on the amount of energy which is exchanged between the fluid in the heat exchanger 36 and the gas in the heating chamber 34.

An important advantage of the improved motor is that the compartments 7 of the annulus 10 of compartments in the buoyant member 8 can cause the rotor M to turn relative to the carrier 1 by the simple expedient of admitting gaseous fluid to successive compartments at a first pressure and by permitting spent gaseous fluid to leave successive compartments 7 in response to rotation of the member 8 about its own axis. In other words, the compartments 7 expand and contract at a rate which is a function of the RPM of the buoyant member 8 while the latter is at least partially immersed in the supply 75 of liquid in the vessel 16 so that it tends to rise and to thereby rotate due to the absence of coincidence of its own axis of rotation with that of the hub 4 and also due to the fact that the expanded compartments 7 move the buoyant member 8 transversely of the direction (arrow P) of the lifting force acting upon the member 8 as a result of its immersion in the supply of liquid. The compartments 7 which contain gaseous fluid contribute to buoyancy of the member 8 in the vessel 16. The chambers 6, 6a cooperate with the conduits 2, 27 to ensure that the member 8 is continuously held out of a position of coaxiality with the hub 4, namely, in a position in which the force P is capable of rotating the member 8 as long as successive compartments 7 receive requisite quantities of gaseous fluid and as long as successive compartments 7 are free to discharge their contents into the chamber 6a. The necessary volume of the gaseous fluid can be obtained by the aforedescribed simple expedient of heating the body of gaseous fluid in the chamber 34.

The sealing rings 11 not only compensate for axial play of the buoyant member 8 relative to the hub 4 but they also prevent the liquid from flowing between the interior of the vessel 16 and the interior of the member 8. The membranes 17 and 17a also contribute to adequate sealing of the interior of the member 8 from the supply 75 of liquid in the vessel 16.

The provision of chambers 6 and 6a in the stationary carrier 1 contributes to simplicity of the motor because such chambers can be readily connected with the heating chamber 34 by stationary conduits 2 and 27. Sealing of the chambers 6, 6a from the supply 75 of liquid in the vessel 16 (e.g., by resort to the aforementioned radial seals 9) can be effected in a simple and inexpensive manner.

The pump 31 can contribute to a higher speed of the circulating gaseous fluid to thus increase the performance of the motor. The purpose of the valve 32 is to draw air from the surrounding atmosphere in order to compensate for leakage of gaseous fluid which is caused to circulate along the endless path defined by the chambers 34, 6, 6a and conduits 2, 27. The check valve 33 is particularly desirable when the pump 31 is omitted.

Figure 2:
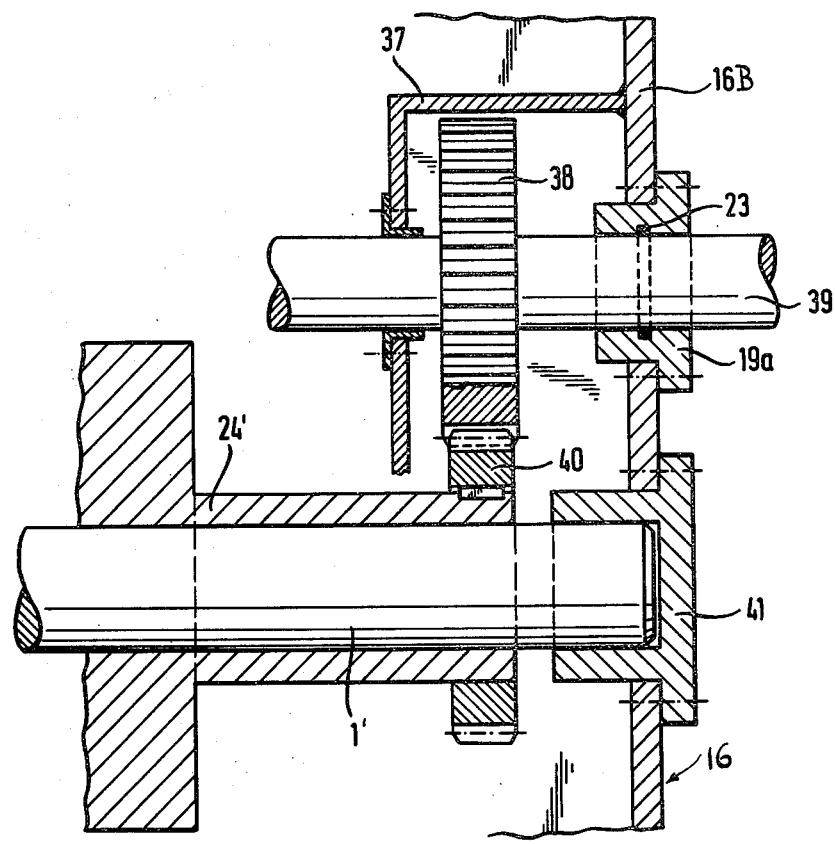
FIG. 2 is an enlarged fragmentary axial sectional view of a motor wherein the carrier is mounted in the vessel for the supply of liquid in a different way.

FIG. 2 illustrates a modified structure for transmission of torque from the rotor of the improved motor to a consumer (such as the driven unit 18 of FIG. 1). In this embodiment of the motor, the right-hand end portion of the modified carrier 1' extends all the way to the right-hand sidewall 16B of the vessel 16 and is installed in an auxiliary bearing 41 mounted in the sidewall 16B. The just described mounting of the carrier 1' contributes to prevention of wobbling or other movements of the carrier and rotor in the vessel 16. The sleeve-like driving element 24' surrounds the right-hand end portion of the carrier 1' within the confines of the vessel 16 and is made integral with or is fixedly connected with a driver gear 40 mating with a driven gear 38 serving to transmit torque to a shaft 39 which drives the driven unit (not shown in FIG. 2). The reference character 38 denotes a schematically illustrated case for the transmission including the gears 38 and 40. The ratio of the illustrated transmission including the gears 38, 30 is assumed to be one-to-one. However, it is equally within the purview of the invention to transmit torque from the sleeve 24' (this sleeve is driven by the rotor of the motor including the structure of FIG. 2) by a step-up or a step-down transmission. The sidewall 16B of the vessel 16 carries a bearing sleeve 19a surrounding a seal 23 for the shaft 39. The right-hand portion of the shaft 39 extends from the vessel 16 and is connected with or constitutes the input element of the driven unit.

The mounting of the carrier 1' in a manner as shown in FIG. 2 contributes to stability of the motor by preventing or reducing the likelihood of wobbling of the carrier 1' and of the hub and driving element 24' thereon.

Figure 4:
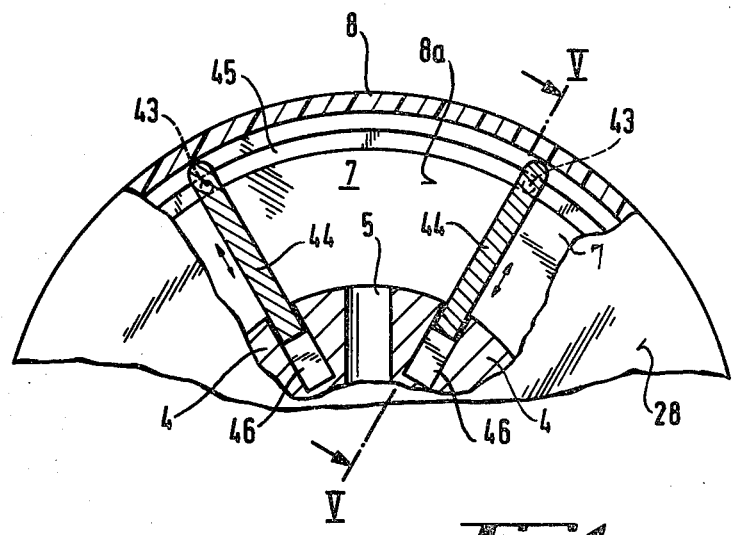
FIG. 4 is a fragmentary partly end elevational and partly sectional view of a modified rotor wherein the neighboring compartments have common walls in the form of radially movable laminae.
Figure 5:
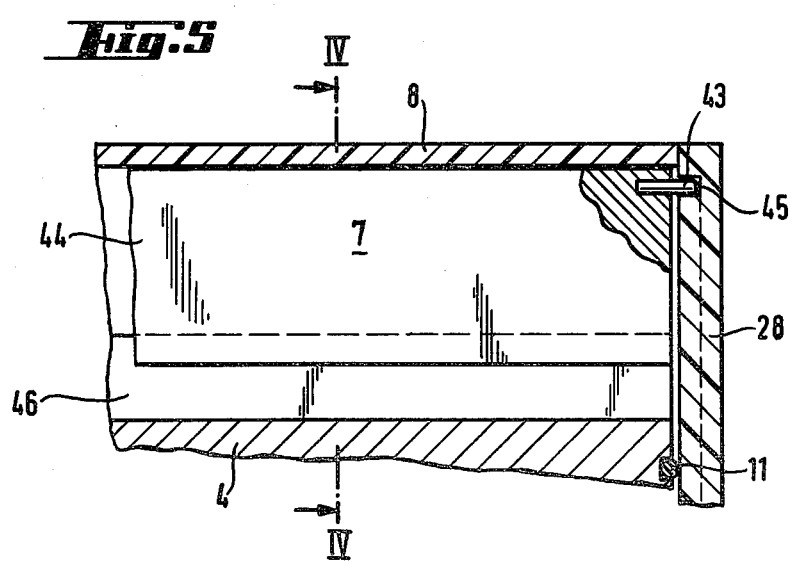
FIG. 5 is a fragmentary sectional view as seen in the direction of arrows from the line V—V of FIG. 4.

FIGS. 4 and 5 illustrate a further modification wherein the aforementioned deformable undulate partitions 72 between the compartments 7 of the annulus 10 are replaced by walls in the form of laminae 44. The radially innermost portion of each lamina 44 is reciprocably received in a discrete socket or recess 46 of the hub 4 in such a way that the tubular member 8 can move radially of the hub with a minimum of resistance. Such radial movements of the inner portions of laminae 44 are due to the fact that the radially outermost portions of the laminae are movably coupled to one or both end walls (8a, 28) of the tubular member 8. As can be seen in FIG. 5, the inner side of the end wall or cover 28 has an endless groove 45 constituting a track for pin-shaped followers 43 which are provided on the outer end portions of the laminae 44. A similar track 45 is provided in the collar 8a (shown in FIG. 4) for pin-shaped followers 43 in the adjacent outer end portions of the laminae 44.

FIG. 4 shows three compartments 7 whose volume has been reduced to a minimum, and FIG. 5 shows a compartment 7 whose volume is somewhere between the minimum and the maximum value, i.e., the inner portion of the lamina 44 shown in FIG. 5 is not received in the radially innermost portion of the respective socket 46. The distance between the radially outermost portions of the laminae 44 and the internal surface of the tubular member 8 is constant because of the provision of followers 43 and associated tracks 45. The manner in which the compartments 7 of the structure shown in FIGS. 4 and 5 receive heated gaseous fluid and discharge gaseous fluid through the ports 5 of the hub 4 is the same as described in connection with FIGS. 1 and 3. The rounded radially outermost portions of the laminae 44 sealingly or substantially sealingly contact the internal surface of the tubular member 8.

Figure 6:
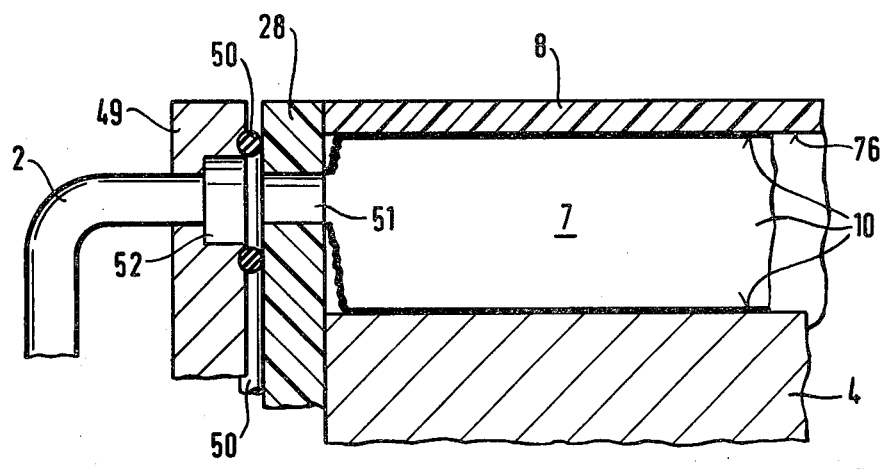
FIG. 6 is a fragmentary axial sectional view of a third rotor wherein the compartments communicate with chambers for pressurized and spent gaseous fluid at one axial end of the buoyant member.

Referring to FIG. 6, there is shown a portion of a fourth motor which can employ a simplified carrier (not shown), namely, a carrier which need not be provided with chambers corresponding to those shown at 6 and 6a in FIG. 1 and 3. Instead, the compartments 7 in the tubular member 8 receive heated gas from the conduit 2 and discharge spent gas into the conduit 27 (not shown in FIG. 6) by way of a stationary valve plate 49 having a first arcuate groove 52 corresponding to the chamber 6 and communicating with the discharge end of the conduit 2, and a second arcuate groove (not specifically shown) corresponding to the chamber 6a and communicating with the conduit 27. The illustrated groove 52 is machined into that end face of the valve plate 49 which faces the cover 28 of the tubular member 8, and such groove is surrounded by a pressure-resistant sealing ring 50 along which the external surface of the cover 28 slides when the tubular member 8 is caused to rotate in a manner and for the reasons as explained in connection with FIGS. 1 and 3. The radially extending ports 5 of the hub 4 shown in FIGS. 1 and 3 are replaced by axially parallel apertures or ports 51 which are machined into or otherwise formed in the cover 28 and communicate with the adjacent compartments 7. Each such compartment can be defined or constituted by a discrete bellows having one or more openings in communication with the respective port or ports 51. The length (as considered in the circumferential direction of the valve plate 49) of the groove 52 can match the length of the other groove (which communicates with the return conduit 27), i.e., the number of compartments 7 which receive hot gaseous fluid from the groove 52 can match the number of compartments 7 which, at the same time, communicate with and admit apent gaseous fluid into the return conduit 27.

Figure 7:
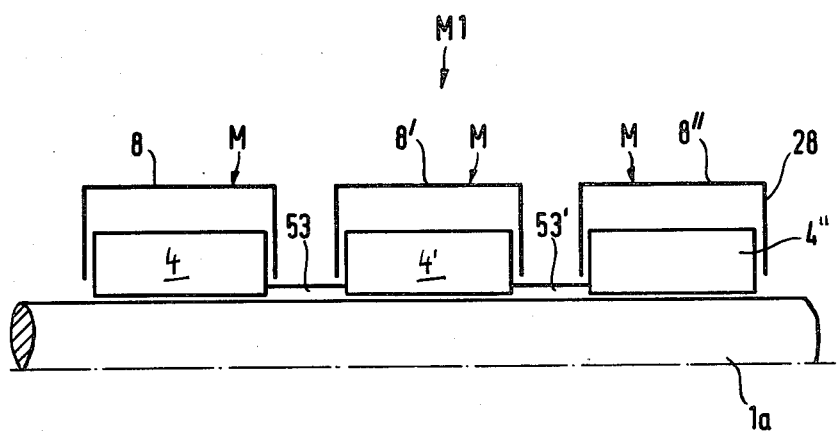
FIG. 7 is a fragmentary schematic axial sectional view of a composite motor with a series of three rotors mounted on a common carrier.

FIG. 7 shows a portion of a composite motor M' with a series of three rotors M (having buoyant tubular members 8, 8', 8") rotatably mounted on a common horizontal carrier 1a. The hubs 4, 4' and 4" rotate with the respective tubular members and are rotatable on the carrier 1a. The reference characters 53 and 53' denote coupling members which respectively connect the hubs 4, 4' and 4', 4". An advantage of the composite motor M' is that it can operate, with a correspondingly reduced performance, when one or even two of its sections are out of commission. The couplings 53 and 53' can be designed to allow for disconnection of the hub 4, 4' or 4" from the remaining hub or hubs in the event of failure of the respective rotor M. The number of rotors in the composite motor will be selected in dependency on the desired maximum performance of the motor.

Each of the rotors M can be designed in a manner as described in connection with and as shown in FIGS. 1 and 3. In such instance, the compartments 7 in the tubular member 8 are preferably angularly offset with reference to the compartments 7 in the members 8', 8", and the compartments of the member 8' are preferably angularly offset with reference to the compartments of the member 8" so as to achieve advantages which are characteristic of an engine having a large number of cylinders. Thus, such distribution of compartments 7 in the rotor portions or members 8, 8' and 8" contributes to smoother operation of the composite motor M' because the intervals between communication of successive compartments with the means for admitting heated gaseous fluid and with the means for receiving spent gaseous fluid are reduced to a fraction of intervals in a motor with a single annulus of compartments.

Figure 8:
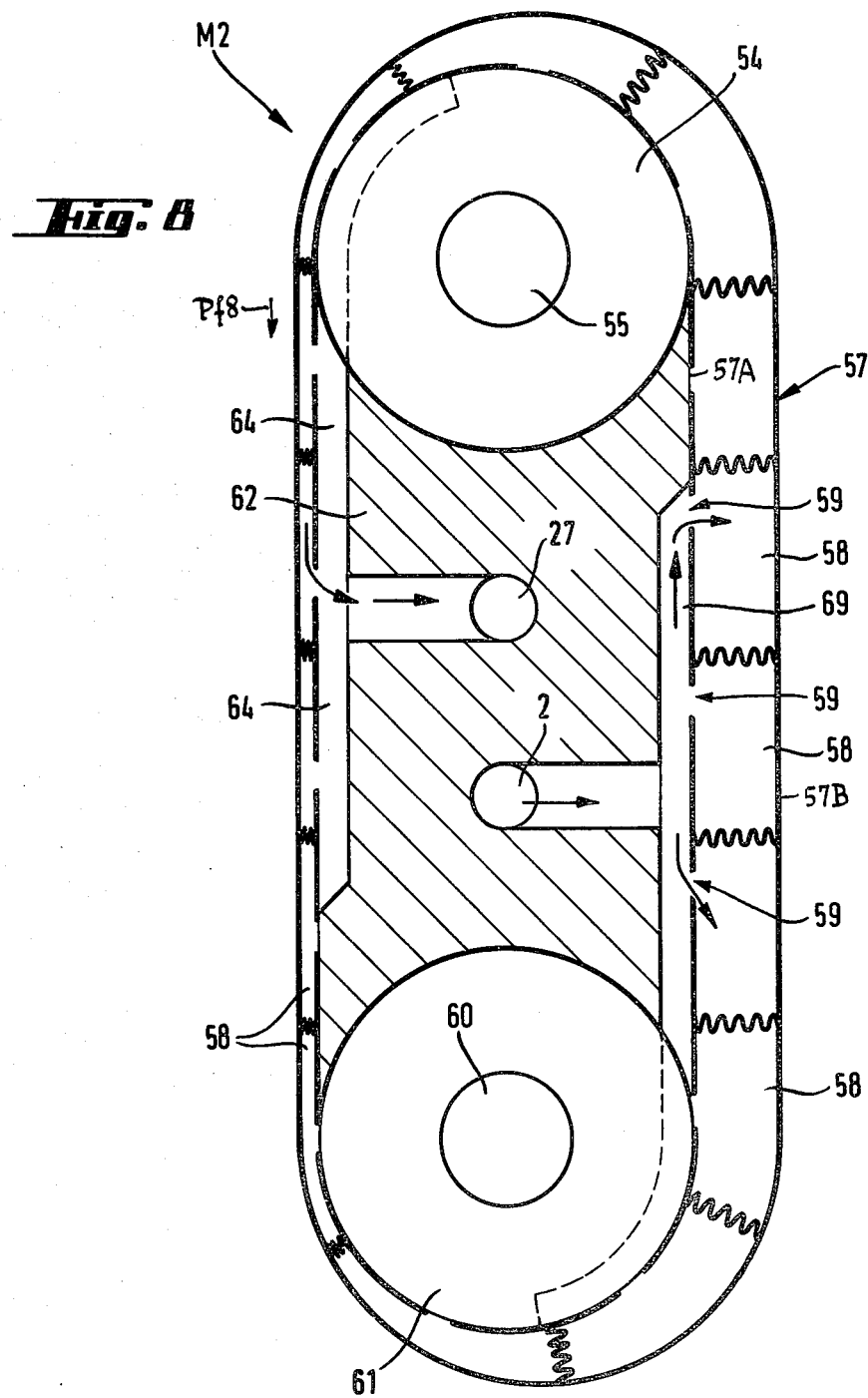
FIG. 8 is a schematic end elevational view of a further motor wherein the buoyant member is an endless flexible element trained over a pair of wheels.

FIG. 8 is a schematic representation of a further motor M2 wherein the buoyant tubular member is an endless flexible band or belt 57 trained over the transmitting torque to at least one of two spaced-apart wheels or pulleys 54 and 61. The shaft 55 of the upper wheel 54 can transmit torque to a driven unit, not shown. The wheel 61 may constitute or perform the function of an idler pulley, i.e., its shaft 60 need not necessarily transmit torque to a driven unit, e.g., to the unit which is driven by the upper shaft 55.

The tubular member 57 is formed with an annulus of expansible and contractible compartments 58 corresponding to the compartments 7 of the motor shown in FIGS. 1 and 3. The chamber 69 corresponds to the chamber 6 of FIG. 1 and receives heated gaseous fluid from a conduit 2; this chamber communicates with the neighboring (expanded) compartments 58 via apertures or ports 59 in the inner wall 57A of the tubular member 57. The chamber 64 receives spent gaseous fluid from the neighboring (contracted) compartments 58 of the member 57 and communicates with the conduit 27. Those apertures or ports 59 which are not in communication with the chamber 64 or 69 are sealed by the adjacent external surface of a stationary carrier 62 which supports the shafts 55, 60 and defines the chambers 64 and 69. The tubular member 57 can be assembled of two flexible (inner and outer) walls in the form of belts 57A, 57B or the like, and the compartments 58 can be defined by discrete bellows which are installed between such walls. In the embodiment of FIG. 8, the length of the chamber 64 equals or approximates the length of the chamber 69, as considered in the direction of advancement of the member 57 (note the arrow PF8), and each of these chambers comprises a straight portion as well as an arcuate portion extending around the respective pulley or wheel.

The heating chamber which receives spent gaseous fluid from the conduit 27 and admits heated gaseous fluid to the conduit 2 is not specifically shown; this heating chamber defines a part of an endless path for the flow of such gaseous fluid into the conduit 2, into the chamber 69, into the neighboring compartments 58, from such compartments into the chamber 64, from the chamber 64 into the conduit 27, and from the conduit 27 back into the heating chamber.

An advantage of the motor M2 is that its performance can appreciably exceed that of the previously described motors. Two or more motors M2 can be connected in series, e.g., substantially in the same way as described in connection with FIG. 7.

It is further to be noted that the improved motor or group of motors need not necessarily operate by providing a closed circuit for the flow of gaseous fluid. For example, if the motor employs hot combustion products, e.g., power plant gas, the chamber 34 of FIG. 1 can constitute a source of hot gaseous fluid and the conduit 27 of FIG. 1 can discharge spent gaseous fluid into the atmosphere, e.g., through a suitable system of filters or the like, not shown. In other words, recirculation and reheating of the gaseous fluid constitute an optional but desirable feature of the improved motor.

Figure 9:
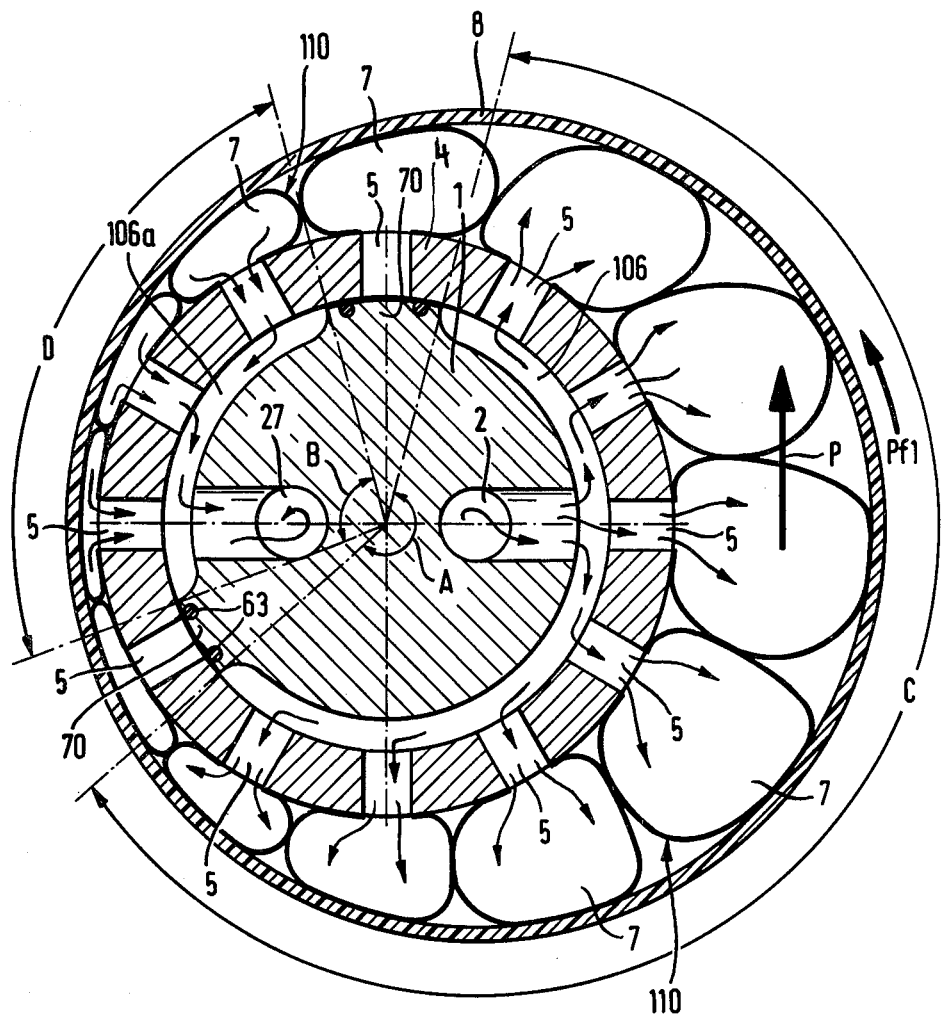
FIG. 9 is a fragmentary transverse vertical sectional view of a motor which constitutes a modification of the motor shown in FIGS. 1 and 3.

FIG. 9 illustrates a further embodiment of the improved motor. An important difference between this motor and the motor of FIGS. 1 and 3 is that the length of the chamber 106a (as considered in the circumferential direction of the carrier 1) is a small fraction of the length of the chamber 106. For example, the angle B along which the chamber 106a extends can be less than one-half the angle A along which the chamber 106 extends. If the angle B is 90°, the angle A can be somewhat in excess of 180°. An advantage of such selection of the length of the chambers 106 and 106a is that the expulsion or evacuation of spent gaseous fluid from the compartments 7 which communicate with the chamber 106a takes place within a fraction of the time during which the compartments 7 are filled with hot gas because they communicate with the chamber 106. The evacuation of spent gaseous fluid takes place while the corresponding compartments 7 travel along the arc D, i.e., the pressure of fluid in the chamber which are adjacent to the arc D is relatively small. The number of compartments 7 which are filled with hot gaseous fluid (during travel along the C=360° minus D) substantially exceeds the number of compartments which communicate with the chamber 106a via ports or apertures 5 in the hub 4. Consequently, the pressure of fluid in the compartments 7 communicating with the chamber 106 (within the area denoted by the arcuate line C) is considerably greater, and such pressure tends to cause the tubular member 8 to rotate due to the eccentricity of its axis with reference to the axis of the hub 4. Otherwise, stated, the ability of the tubular member 8 to expel spent gaseous fluid from the compartments 7 which communicate with the chamber 106a is more pronounced and the buoyancy of the tubular member 8 is also more pronounced because of the relatively large number of compartments 7 which are filled with hot gaseous fluid. Still further, the motor which embodies the structure of FIG. 9 can dispense with the pump 31 of FIG. 1 because the chamber 106 is longer than the chamber 106a. This furnishes a certain pumping action to circulate the gaseous fluid along its endless or open path. As mentioned above, the chamber 106a need not return spent gaseous fluid into a chamber wherein the fluid is reheated to be returned into the conduit 2; instead, the chamber 106a can discharge spent gaseous fluid directly into the surrounding atmosphere or to a chamber other than that which admits heated gaseous fluid into the chamber 106. In other words, the circuit for the flow of gaseous fluid through the chambers 106, 106a and compartments 7 may but need not be a closed circuit. A pump 31 may be of advantage irrespective of whether the just discussed circuit is an open or a closed circuit because it can increase the volume of gaseous fluid which is admitted into the chamber 34 or into another chamber serving to supply gaseous fluid to the chamber 6, 6' or 106. The check valve 33 is not needed in the motor of FIG. 9 irrespective of whether or not this motor employs the pump 31 or an equivalent fluid flow machine.

Another difference between the motor of FIGS. 1 and 3 on the one hand and the motor of FIG. 9 on the other hand is that the motor of FIG. 9 employs an annulus of discrete compartments 7 each of which can be constituted by a separate bellows which need not be connected to the tubular member 8 and/or to the neighboring bellows; all the counts is that each bellows remain in communication with the corresponding port or ports 5 of the hub 4. Thus, whereas each of the partitions 72 shown in FIG. 3 can form part of two neighboring compartments 7, each of the compartments 7 shown in FIG. 9 is surrounded or defined or constituted by a separate bellows which is not connected with the neighboring bellow or bellows. Each such separate bellows is connected solely to the adjacent portion of the hub 4.

The operation of the motor which embodies the structure of FIG. 9 is analogous to that of the motor which is shown in FIGS. 1 and 3. Thus, the rotor including the hub 4 and the tubular member 8 is immersed into a supply of liquid in a vessel (such as the vessel 16 of FIG. 1). The supply of liquid in the vessel may but need not serve to heat or cool the fluid in one or more auxiliary heat exchangers (such as the heat exchanger 74 of FIG. 1). The hub 4 and the tubular member 8 can rotate with reference to the carrier 1. Consequently, when the gaseous fluid filling the compartments 7 which communicate with the chamber 106 causes the tubular member 8 to move its axis out of a position of coincidence with the axes of the carrier 1 and hub 4, the member 8 is caused to rotate in the direction of arrow Pf1 due to the development of the force which is indicated by the arrow P, whereby the member 8 rotates the hub 4 and the latter rotates the driven unit, not shown in FIG. 9. The gaseous fluid which is discharged from the chamber 106a and flows through the coil 27a of the conduit 27 is cooled during passage through the supply of liquid in the vessel 16. The heat energy which is thereby withdrawn from the gaseous fluid flowing through the coil 27a of the conduit 27 is stored in the supply of liquid and can be withdrawn from such supply for use in any one of a number of different ways, e.g., for the heating of gaseous fluid which is used in a second motor, not shown in FIG. 9. All that is necessary is to provide one or more additional or auxiliary heat exchangers (corresponding to the heat exchanger 74 of FIG. 9) serving to withdraw heat from the supply of liquid which is heated by the gaseous fluid issuing from the chamber 106a of FIG. 9.

The temperature differential between the gaseous fluids in the conduits 2 and 27 should suffice to start the rotor including the hub 4 and the tubular member 8. For example, if the outer diameter of the rotor including the parts 4 and 8 of FIG. 9 is 500 mm, the pressure in the conduit 2 can be in the range of 0.05 atmosphere superatmospheric pressure; this suffices to set the tubular member 8 in rotary motion. If the gaseous fluid is air, the pressure differential of 0.05 atmosphere between the chambers 106 and 106a corresponds to a temperature differential of approximately 14° C.

The motor of FIGS. 1 and 3 or the motor of FIG. 9 can be constructed as follows: The diameter of the tubular member 8 may be approximately 1000 mm, the axial length of the member 8 can equal 2000 mm, the weight of the member 8 can be approximately 100 kp, the maximum eccentricity of the member 8 with reference to the hub 4 may be in the range of 100 mm, and the rotor M including the parts 4 and 8 can rotate at 200 revolutions per minute.

The upward lifting force P of the tubular member may equal or approximately 1.570 kp (P=area times length minus weight of the tubular member). The generated power of such a motor is calculated by multiplying the eccentricity of the tubular member 8 with 3.14, RPM and, in the just given example equals 98.696 mkp/minute which is tantamount to 22 horse powers or 17 kilowatts. The power increases accordingly with rising RPM of the rotor.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A motor comprising a supply of liquid; a rotor including a buoyant member which is at least partially immersed in the liquid; a carrier rotatably and radially movably mounting said member; a succession of expansible and contractible compartments on said members; and means for admitting into successive compartments a gaseous fluid so as to move said member to a position of eccentricity with reference to said carrier at least in part transversely of the direction of the force tending to lift the member in the liquid whereby the member is caused to rotate with reference to said carrier.

2. The motor of claim 1, wherein said fluid admitting means comprises a source of hot gaseous fluid and means for supplying hot fluid from said source to successive compartments.

3. The motor of claim 2, wherein the hot fluid is air.

4. The motor of claim 1, further comprising means for regulating the admission of gaseous fluid into and the evacuation of gaseous fluid from successive compartments in response to rotation of said member with reference to said carrier.

5. The motor of claim 1, wherein said rotor further comprises a hub mounted on said carrier for rotation about a fixed axis, said member surrounding and being movable radially of said hub.

6. The motor of claim 5, wherein said member is a tube and said compartments are disposed between said tube and said rotor.

7. The motor of claim 1, wherein said fluid admitting means includes a heating chamber containing a body of gaseous fluid and means for heating the fluid in said chamber.

8. The motor of claim 7, wherein said heating means comprises a heat exchanger.

9. The motor of claim 1, further comprising a vessel confining said supply of liquid and having wall means, said carrier being mounted in said wall means and having a socket, and further comprising a shaft rotatably extending into said socket and means for transmitting torque from said member to said shaft.

10. The motor of claim 9, further comprising bearing means mounted in said vessel at a location remote from said wall means and rotatably supporting said shaft.

11. The motor of claim 1, further comprising a vessel confining said supply of liquid and having first and second wall means, said carrier being mounted in said first and second wall means and further comprising a driving element rotatably mounted on said carrier and receiving torque from said member, a shaft extending from said vessel, and means for rotating said shaft in response to rotation of said driving element.

12. The motor of claim 11, wherein said rotating means includes a transmission having a case in said vessel, a first gear provided in said case and driven by said driving element, and a second gear provided on said shaft in said case and receiving torque from said first gear.

13. The motor of claim 1, wherein said fluid admitting means comprises a first chamber defined by said carrier, a second chamber defined by said carrier, means for supplying gaseous fluid at a first pressure to said first chamber, means for evacuating gaseous fluid at a lower second pressure from said second chamber, and means for connecting successive compartments first with said first chamber, whereby such compartments expand, thereupon with said second chamber, whereby such compartments contract, thereupon again with said first chamber, and so forth.

14. The motor of claim 1, wherein said rotor further comprises a hub mounted on said carrier and rotatable about a fixed axis, and means for transmitting torque from said member to said hub, said member having first and second end walls adjacent to the axial ends of said hub and further comprising sealing means interposed between said end walls and the respective axial ends of said hub.

15. The motor of claim 1, further comprising a vessel confining said supply of liquid and means for receiving spent gaseous fluid from successive compartments, said receiving means including a coil immersed in said supply of liquid and arranged to effect an exchange of heat between such liquid and the gaseous fluid therewithin.

16. The motor of claim 1, wherein said admitting means comprises a heating chamber containing a body of gaseous fluid, first conduit means for supplying gaseous fluid from said chamber to successive compartments, second conduit means for returning gaseous fluid from successive compartments to said chamber, and pump means provided in said second conduit means and arranged to cause the fluid to flow into said chamber.

17. The motor of claim 16, further comprising check valve means provided in said second conduit means downstream of said pump means and arranged to prevent the flow of gaseous fluid from said chamber toward said pump means.

18. The motor of claim 1, wherein said admitting means comprises a stationary valve adjacent to one axial end of said member and having a first chamber containing gaseous fluid at a first pressure and a second chamber containing gaseous fluid at a lower second pressure, and means for alternatively establishing communication between successive compartments and said first and second chambers in response to rotation of said member.

19. The motor of claim 18, wherein said member has an end wall adjacent to said valve and provided with apertures, at least one for each of said compartments and each communicating with the respective compartment, said apertures constituting said communication establishing means.

20. The motor of claim 1, wherein said compartments together constitute an annulus and include partitions separating neighboring compartments from one another.

21. The motor of claim 20, wherein said rotor further comprises a hub mounted on said carrier for rotation about a fixed axis and arranged to rotate in response to rotation of said member, each of said compartments further having an outer wall secured to said member and an inner wall secured to said hub.

22. The motor of claim 21, wherein the volumes of said compartments are identical when said member is coaxial with said hub.

23. The motor of claim 1, wherein said rotor further comprises a hub supported by said carrier for rotation about a fixed axis and having a peripheral surface provided with recesses, said member surrounding said hub and being movable radially thereof, said partitions including walls extending into said recesses and connected with said member.

24. The motor of claim 23, wherein said walls are laminae and include followers coupled to and movable with said member radially of said hub.

25. The motor of claim 24, wherein said member has at least one end wall extending radially inwardly toward said hub and having a track for the followers of said laminae.

26. The motor of claim 1, wherein said rotor further comprises a hub supported by and rotatable relative to said carrier, said compartments being provided in said hub and said rotor further comprising pistons reciprocably received in said compartments and arranged to move said member radially of said hub in response to admission of fluid into the respective compartments.

27. The motor of claim 26, wherein said hub has a peripheral surface and said compartments are cylinder bores provided in the peripheral surface of said hub.

28. The motor of claim 1, wherein said rotor further comprises a first hub rotatably supported by said carrier and receiving torque from said member, and further comprising a second rotor including a second hub coaxial with said first hub and rotatably supported by said carrier and a second buoyant member at least partially immersed in said supply of liquid and arranged to rotate said second hub, and further comprising means for coupling said hubs to one another.

29. The motor of claim 28, wherein said second rotor further comprises a plurality of compartments on said second member, the compartments on said second member being angularly offset with reference to the compartments on said first mentioned member.

30. The motor of claim 1, wherein said rotor further comprises a driving element supported by said carrier for rotation about a fixed axis and means for transmitting torque from said member to said driving element, said torque transmitting means comprising a membrane having a first portion connected with said member and a second portion connected with said driving element.

31. The motor of claim 30, wherein said rotor further comprises a hub coaxial with and arranged to rotate with said driving element in response to rotation of said member, said torque transmitting means further comprising a second membrane having a first portion connected to said member and a second portion connected to said hub.

32. The motor of claim 1, wherein said buoyant member includes an endless flexible element and said compartments are confined in the interior of said flexible element and are arranged to move along an endless path in response to rotation of said member.

33. The motor of claim 32, wherein said fluid admitting means comprises first and second chambers adjacent to first and second portions of said path, means for supplying pressurized fluid to said first chamber and means for evacuating fluid from said second chamber, said member having apertures alternatively connecting said compartments with said first and second chambers in response to rotation of said member so that the compartments expand during communication with the first chamber and contract and simultaneously discharge fluid into said second chamber during travel along said second portion of said path.

34. The motor of claim 32, further comprising a pair of wheels rotatably mounted on said carrier, said member being trained over and being arranged to drive at least one of said wheels.

35. The motor of claim 1, wherein said fluid admitting means comprises first conduit means and further comprising second conduit means receiving fluid from the compartments in certain angular positions of said member, said compartments being arranged to travel with said member along an endless path having a relatively long portion wherein the compartments communicate with said first conduit means and a relatively short portion wherein said compartments communicate with and admit gaseous fluid to said second conduit means.

36. The motor of claim 35, further comprising a first chamber receiving gaseous fluid from said first conduit means and communicating with the compartments in said long portion of said path, and a second chamber communicating with said second conduit means and with the compartments in said short portion of said path.

37. The motor of claim 1, wherein each of said compartments comprises a discrete deformable body arranged to move along an endless path in response to rotation of said member, said admitting means comprising a first chamber adjacent to a first portion of said path and arranged to admit gaseous fluid to the compartments which are adjacent thereto and further comprising a second chamber adjacent to a second portion of said path and arranged to receive gaseous fluid from the compartments which are adjacent thereto.

38. The motor of claim 1, wherein said fluid admitting means includes means defining for such fluid an endless path and means for causing the fluid to circulate along such path.

39. The motor of claim 38, wherein said means for causing the fluid to circulate includes pump means.

40. The motor of claim 38, wherein the means for causing the fluid to circulate includes first chamber means for admitting fluid from said path into a first number of compartments and second chamber means for returning fluid into said path from a smaller second number of compartments.

41. The motor of claim 1, wherein said fluid admitting means includes means defining an open path having an inlet for reception of gaseous fluid upstream of said compartments and an outlet to discharge of gaseous fluid downstream of said compartments, said compartments being arranged to travel along an endless path a portion of which is adjacent to said open path so that successive compartments first receive fluid from and thereupon return fluid into said open path.

42. The motor of claim 41, further comprising pump means for causing the fluid to flow from said inlet to said outlet.

43. The motor of claim 42, wherein said admitting means includes a heating chamber for gaseous fluid located between said inlet and said endless path and means for heating the fluid in said chamber before such fluid enters said compartments.

* * * * *